Dec. 21, 1948.　　　　　　　L. F. CURTIS　　　　　　2,457,034
ARRANGEMENT FOR SIMULATING A REACTIVE IMPEDANCE
Filed June 21, 1946　　　　　　　　　　　　　　2 Sheets-Sheet 1
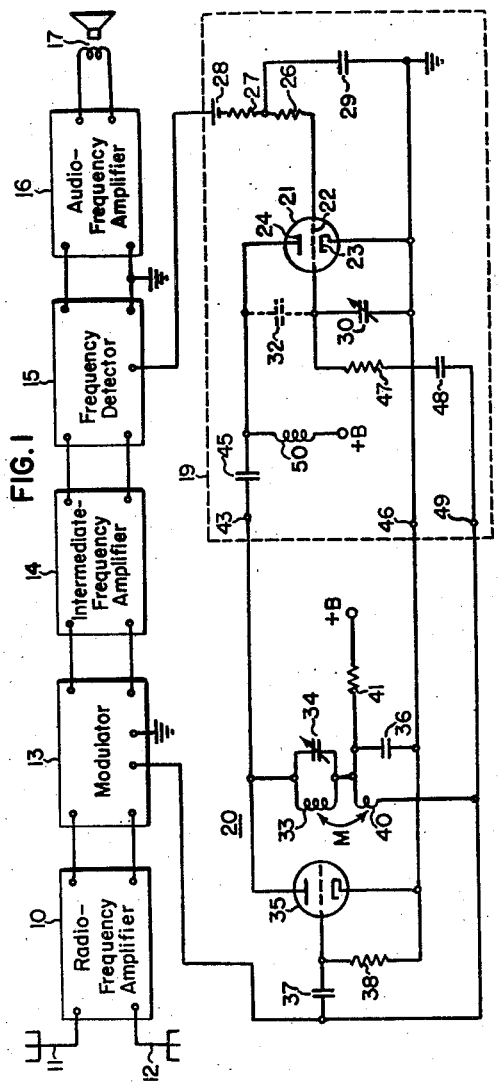
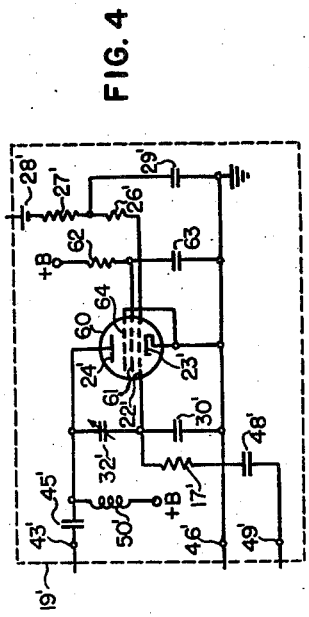
INVENTOR,
LESLIE F. CURTIS,
BY
ATTORNEY.

Dec. 21, 1948.  L. F. CURTIS  2,457,034
ARRANGEMENT FOR SIMULATING A REACTIVE IMPEDANCE
Filed June 21, 1946  2 Sheets-Sheet 2
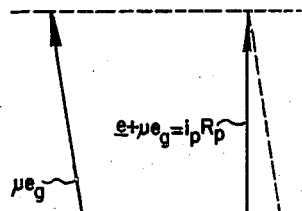
FIG. 3
FIG. 2a
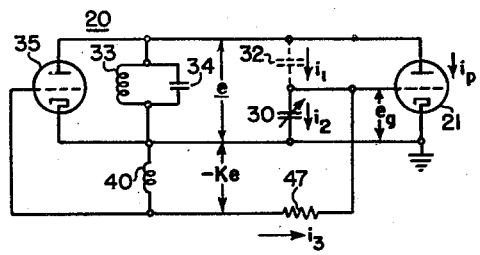
FIG. 2b
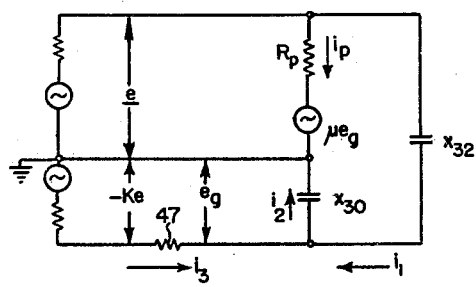
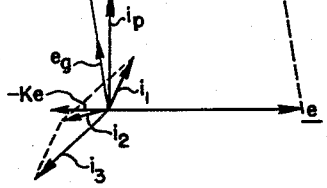
INVENTOR,
LESLIE F. CURTIS,
BY
ATTORNEY.

Patented Dec. 21, 1948

2,457,034

UNITED STATES PATENT OFFICE 2,457,034

ARRANGEMENT FOR SIMULATING A REACTIVE IMPEDANCE

Leslie F. Curtis, Great Neck, N. Y., assignor to Hazeltine Research, Inc., Chicago, Ill., a corporation of Illinois Application June 21, 1946, Serial No. 678,263

11 Claims. (Cl. 178—44)

1

This invention relates to arrangements for simulating, within a selected range of frequencies, controllable substantially pure reactive impedances. Such an arrangement is particularly suited for use in an automatic-frequency-control system for controlling the frequency of an oscillator and, hence, will be described in that connection.

Pentode-tube arrangements and, to a more limited extent, triode-tube arrangements, have been utilized to cause a controllable reactive current to flow in the anode-cathode path of the tube for application to the terminals of a resonant circuit to control the frequency thereof. In the usual reactance-tube arrangement, the output circuit of the tube is connected in shunt with the resonant circuit while the input circuit thereof is connected to the resonant circuit through a resistance-capacitance phase-shifting network which applies to the input circuit of the reactance tube an alternating potential which is nearly 90° out of phase with respect to the potential across the resonant circuit, and then only for very small input voltages. Likewise as the potential which is applied to the input terminals of the reactance tube from the phase-shifting network more nearly approaches the above-mentioned 90° relation, the control voltage developed by the phase-shifting network becomes smaller in value, so that the effectiveness of the phase-shifting network and the reactance tube are greatly reduced. Thus, the reactance tube never provides at its output electrodes a pure reactive current. Hence, the reactance tube draws a resistive or in-phase component of current from the resonant circuit which may undesirably load the latter to an extent which varies with the magnitude of the unidirectional biasing potential on the control electrode of the reactance tube. This, in turn, may unfavorably alter the amplitude of oscillations and hence the potential developed across the resonant circuit.

The magnitude of the real or in-phase component of the space current drawn by a triode reactance-tube arrangement from a resonant circuit is particularly large due to the relatively low anode-cathode resistance and to a relatively large interelectrode capacitance of the triode, specifically the anode control-electrode capacitance thereof. In some triode arrangements wherein attempts have been made unsuccessfully to utilize the anode control-electrode capacitance of the triode, the cathode control-electrode capacitance has influenced the operation of the phase-shifting network so that an even greater

2 in-phase component of space current results. The effect of the anode control-electrode capacitance, which heretofore has been considered undesirable in triode reactance-tube arrangements, and hence has been usually avoided rather than utilized, will be considered in greater detail subsequently. As a result of the above-mentioned shortcomings in triode reactance-tube control units, pentode reactance-tube arrangements have been utilized more extensively. The last-mentioned arrangements have proved, in general, to be more satisfactory because of the high anode-cathode resistance of the pentode and because of the shielding action afforded by the screen and the suppressor electrodes thereof which is effective materially to reduce the anode control-electrode capacitance. The space current of a pentode tube in such an arrangement is therefore more nearly in phase with the voltage applied to the input circuit of the pentode and, for many applications, the real component of the space current is ordinarily neglected because of the high internal resistance of the tube. However, any prior resistance-capacitance phase-shifting network in combination with a pentode has not been capable of developing a space current having the desired 90° relation with the voltage applied to the input circuit of the pentode so as to provide best performance. While possessing the advantages over triode arrangements mentioned above, known pentode reactance-tube units are not as sensitive as desired for many purposes. Furthermore, some pentode reactance-control units afford best operation only at a single frequency or over a very small range of frequencies. For certain purposes it may be desirable to employ a pentode-tube arrangement having a comparatively high sensitivity over a relatively wide range of frequencies, while for other applications it may be preferable to utilize a triode reactance-tube arrangement to impress to controllable reactance on a resonant circuit to alter the frequency thereof.

Considering further certain aspects of a triode in a reactance-control unit, the anode control-electrode capacitance of the triode is effective to couple the control electrode of the tube to that portion of the circuit connected to the anode of the tube. In arrangements of the type under consideration, the phase of the derived potential at the control electrode-cathode circuit of the triode differs from that at its anode-cathode circuit by less than 90° as determined by the elements of the usual phase-shifting network.

Consequently, the resultant effective potential on the input circuit of the triode is not in proper phase relationship to develop a space current in the triode which is in phase quadrature with the potential between the anode and the cathode of the tube. The anode-cathode circuit of the tube also carries a current in phase with the voltage thereacross which is inversely proportional to the anode-cathode resistance of the tube. Components of space current due to the control electrode-cathode potential and due to the anode-cathode potential are therefore in such phase as undesirably to load the circuit connected between the anode and the cathode of the tube. Furthermore, the magnitude of the resistive or in-phase component of this space current varies with the magnitude of the unidirectional biasing potential which is applied to the input circuit of the triode from a frequency-detector unit, thus altering the potential across the resonant circuit in a manner undesirably to influence the operation thereof. For example, the oscillator including the resonant circuit may become degenerative.

If the phase of the input voltage or the output current of the triode in a reactance-control unit is reversed by a transformer, the in-phase component of the space current which provided a degenerative action on the oscillator, as stated above, now is in phase with the potential across the resonant circuit so that the oscillator is now regenerative. This undesirably alters the output voltage of the oscillator.

Certain prior triode-type reactance-control arrangements have partially compensated for the undesirable influence of the anode control-electrode capacitance of a triode tube employed in an automatic-frequency-control system. However, the operation of such arrangements has not been entirely satisfactory. Some have been frequency selective or have not been effective for frequency-controlling purposes over a relatively wide range of frequencies. Others have been difficult to adjust for proper operation or have not been sufficiently sensitive for some purposes.

It is an object of the present invention, therefore, to provide a new and improved arrangement for simulating, within a selected range of frequencies, a controllable substantially pure reactive impedance, which arrangement overcomes one or more of the above-mentioned disadvantages and limitations of prior arrangements.

It is another object of the invention to provide a new and improved arrangement for simulating, within a selected range of frequencies, a controllable substantially pure reactive impedance, which arrangement is substantially non-frequency selective over the aforesaid range of frequencies and is relatively easy to adjust for proper operation within that range of frequencies.

It is a further object of the invention to provide an extremely sensitive arrangement utilizing an electron tube of the triode type for simulating a controllable and substantially pure reactive impedance.

In accordance with the invention, an arrangement for simulating, over a selected range of frequencies, a controllable substantially pure reactive impedance comprises an electron tube having control electrode and cathode input electrodes and having anode and cathode output electrodes between which the controllable reactive impedance is developed. The arrangement also includes means for applying to the output electrodes a first high frequency alternating-potential having a frequency within the above-mentioned range. The arrangement further includes a phase-shifting network having at least one phase-shifting resistive impedance and having phase-shifting reactive impedances comprised only by capacitance between the input electrodes and between the anode and the control electrode so that the reactive impedances have values varying in the same sense with frequency. The phase-shifting network includes means for applying through the resistive impedance to the junction of the reactive impedances at the control electrode a second high-frequency alternating potential having the same frequency but opposite polarity to that of the first alternating potential. The values of the impedances are so selected that the network is responsive to the first and second alternating potentials to apply to the input electrodes a resultant alternating potential of a phase to cause the tube to provide at the output electrodes a space current which is substantially in phase-quadrature relation to the first alternating potential over the selected range of frequencies.

For a better understanding of the present invention, together with other and further objects thereof, reference is had to the following description taken in connection with the accompanying drawings, and its scope will be pointed out in the appended claims.

Referring now to the drawings, Fig. 1 is a circuit diagram, partly schematic, of a complete frequency-modulation carrier-signal receiver including an arrangement for simulating a controllable reactive impedance in accordance with a particular form of the present invention; Fig. 2a is a simplified schematic circuit diagram of an oscillator and an arrangement in accordance with the invention for controlling the frequency of the oscillator; Fig. 2b is the equivalent circuit diagram of the Fig. 2a arrangement; Fig. 3 is a vector diagram which is useful in conjunction with the equivalent circuit diagram of Fig. 2b in explaining the operation of the portion of the Fig. 1 arrangement comprising the instant invention; and Fig. 4 is a schematic circuit diagram of a modified form of the invention.

Referring now more particularly to Fig. 1, there is represented schematically a complete frequency-modulation carrier-signal receiver having automatic frequency control and embodying the present invention in a preferred form. In general, the receiver includes a radio-frequency amplifier 10 having an input circuit connected to an antenna system 11, 12 and having an output circuit connected to a modulator 13 forming a part of a frequency changer. The frequency changer includes an oscillator portion or unit 20 which will be more fully described hereinafter. Connected in cascade with the modulator 13, in the order named, are an intermediate-frequency amplifier 14 of one or more stages, a frequency detector 15, an audio-frequency amplifier 16 of one or more stages, and a sound reproducer 17. One of the output circuits of the frequency detector 15 is connected to the oscillator unit 20 through a control unit 19.

It will be understood that the various units just described may, with the exception of the control unit 19, be of conventional construction and operation, details of which are well known in the art, rendering detailed description thereof unnecessary. Considering briefly the operation of the receiver as a whole, and neglecting for the moment the exact details of operation of the control unit 19 presently to be described, a desired frequency-modulated carrier signal is intercepted by the antenna system 11, 12, selected and amplified by the radio-frequency amplifier 10, converted to an intermediate-frequency signal by the frequency changer including the modulator 13 and the oscillator 20, amplified in the intermediate-frequency amplifier 14, and detected by the frequency detector 15, thereby to derive the audio-frequency modulation components. The audio-frequency components are, in turn, amplified in the audio-frequency amplifier 16 and are reproduced by the sound reproducer 17 in a conventional manner.

It will be understood that the receiver preferably includes means, included in or preceding the detector 15, for eliminating or reducing the effects of undesired amplitude-modulation components in the reproduced signal. This last-named means may be of any type, insofar as the present invention is concerned and many such arrangements, per se, are well known to those skilled in the art. When the frequency of the signal applied by the oscillator 20 to the modulator 13 alters so that the intermediate-frequency output signals of the modulator 13 deviate from the frequency to which the intermediate-frequency amplifier 14 is tuned, a control voltage proportional to the extent of the deviation is applied by the frequency detector 15 to the control unit 19. The latter supplies a suitable reactive impedance in parallel with the tuned circuit of the oscillator 20 which is effective to correct the frequency of the output signal thereof so that the intermediate-frequency signal is adjusted automatically to a frequency near its proper value. In this manner any inaccuracies in the tuning of the receiver are corrected as well as any frequency drift of the oscillator 20.

Referring now more particularly to the portion of the system embodying the present invention, the control unit 19 for simulating, over a selected range of frequencies, a controllable substantially pure reactive impedance comprises an electron tube 21 effectively of the triode type, preferably, a high mutual-conductance triode. Triode 21 includes input electrodes which comprise a control electrode 22 and a cathode 23 and output electrodes which comprise an anode 24 and the cathode 23. A controllable reactive impedance is developed between the output electrodes in a manner to be explained subsequently. The control electrode 22 of triode 21 is connected to an output circuit of the frequency detector 15 through the series combination of filter resistors 26 and 27, and a unidirectional source of biasing potential 28. A filter condenser 29 is coupled between the junction of the resistors 26 and 27 and ground. The control electrode 22 is also connected to the grounded cathode 23 through an adjustable condenser 30 which includes the inherent capacitance between those electrodes. A condenser 32 is connected between the anode 24 and the control electrode 22 of tube 21 to couple the control electrode to a first high frequency alternating-potential source which will be described subsequently. This capacitance is represented by broken lines since it may be comprised in whole or in part by the inherent interelectrode capacitance of the tube. This capacitance has a substantial value over the operating range of frequencies of unit 19 since tube 21 is a triode. The first high frequency alternating potential has a frequency within the operating range of frequencies of unit 19 and comprises the parallel-resonant circuit including a winding 33 and an adjustable condenser 34 of the oscillator 20. One end of this parallel-resonant circuit is connected to the anode of an electron tube 35 while the other end is connected to the grounded cathode of the tube through a by-pass condenser 36. The control electrode of tube 35 is coupled to an input terminal of the modulator 13 through a coupling condenser 37 and to the grounded cathode through a grid-leak resistor 38. One end of a reverse or feedback winding portion 40, which portion comprises a second high frequency alternating-potential source, is connected to the winding 33 and to a source of potential +B through a resistor 41, while the other end of winding 40 is connected to the terminal of condenser 37 which is connected to an input terminal of the modulator 13. Feedback winding 40 is magnetically coupled to winding 33 so that an alternating potential across the resonant circuit 33, 34 is effective to induce a voltage across winding 40.

The arrangement for simulating a controllable reactive impedance also includes means for coupling the output electrodes 23 and 24 of the triode 21 to the resonant circuit 33, 34. This means comprises a first terminal 43 which is coupled to the anode electrode 24 of triode 21 through a coupling condenser 45 and is connected directly to the anode terminal of tube 35. A source of potential +B is connected to the anode 24 of tube 21 through a radio-frequency choke 50. The coupling means also comprises a second terminal 46 which is coupled to one end of the resonant circuit 33, 34 through the by-pass condenser 36, and is directly connected to the cathode 23 of triode 21. The previously described feedback winding 40 is poled in such a manner that it comprises a means for deriving from the first alternating-potential source 33, 34 a second high frequency alternating potential having the same frequency but opposite polarity to that of the first alternating potential.

The reactive impedance simulating arrangement of the instant invention also comprises a phase-shifting network, which is coupled to the feedback winding 40, having at least one phase-shifting resistive impedance and having phase-shifting reactive impedances comprised only by capacitance between the input electrodes of tube 21 and between the anode and control electrode thereof, so that the reactive impedances have values varying in the same sense with frequency. These capacitances comprise the anode control-electrode capacitance 32 of triode 21 and the adjustable condenser 30 which is connected in shunt relation with the input electrodes 22, 23 of triode 21 thereby to supplement the input capacitance thereof (not shown). The phase-shifting network also includes a resistor 47, one end of which is connected to the control electrode 22 of triode 21 while the other end is connected to the feedback winding 40 of oscillator 20 through a blocking condenser 48 and a terminal 49.

The described phase-shifting network is responsive to potentials from the resonant circuit 33, 34, and from the reverse winding 40, so as to apply to the input electrodes of tube 21 a resultant alternating potential of a phase such as to cause the triode 21 to develop at its output electrodes 23, 24 a net space current which is substantially in phase-quadrature relation to the potential from the above-mentioned resonant circuit over the selected range of frequencies. The phase relationship of this resulting alternating potential will be treated in detail subsequently.

Referring now to Fig. 2a of the drawings, there is illustrated a simplified circuit diagram of the automatic-frequency-control arrangement of Fig. 1 including the essential elements of the oscillator and control tube circuit. Elements corresponding to those illustrated in the Fig. 1 arrangement are identified by the same reference characters. It will be apparent presently that this diagram is useful in considering the voltage and current relations in the various portions of the reactive impedance-controlling arrangement. The voltage $\underline{e}$ represents the first high frequency alternating potential developed across the resonant circuit 33, 34 of the oscillator 20. The voltage $-Ke$ which is the voltage induced in the feedback winding 40, has a magnitude which is a small fraction K of the potential $e$ developed in the resonant circuit 33, 34, and has the same frequency as the last-mentioned voltage but a polarity opposite thereto. The effective potential which is applied to the input electrodes of triode 21 is indicated as $e_g$. Considering now the currents flowing in the various branches of the phase-shifting network and through the triode 21, the space current flowing through the tube 21 is designated $i_p$; the current flowing through the condenser 32 is $i_1$; the current flowing through the adjustable condenser 30 is $i_2$; and the current flowing through the resistor 47 is $i_3$. The direction of the current flow is assumed, for the purpose of analysis of the circuit operation, to be as shown by the arrows.

Fig. 2b, which is the equivalent circuit for the Fig. 2a arrangement, illustrates a circuit wherein the tube 21 is replaced by its equivalent generator $\mu e_g$ in series with the internal resistance of the tube $R_p$. The sign of the equivalent generator $\mu e_g$ is considered positive in sense since the current in the tube has been assumed to have a direction from anode to cathode. It will also be noted that the resonant circuit 33, 34 and the feedback winding 40 have been replaced by equivalent generators. The condensers in the phase-shifting network are designated by the reactances $x_{30}$ and $x_{32}$.

Considering now the operation of the Fig. 2b arrangement for simulating a substantially pure reactance, it is assumed that the current $i_1$ is that which flows through the reactive impedance $x_{32}$ to the junction point with reactive impedance $x_{30}$. It is also assumed that all the current $i_2$ is that which flows through the reactance $x_{30}$ and that the current $i_3$ is that which flows through resistor 47. Accordingly, the following expressions will hold.

$$i_2 = i_1 + i_3 \quad (1)$$

$$e_g = -jx_{30}i_2 \quad (2)$$

$$e - e_g = -jx_{32}i_1 \quad (3)$$

and $$-Ke = R_{47}i_3 - jx_{30}i_2 \quad (4)$$

Reference is now made to Fig. 3 for a graphical representation of the operation of the Fig. 2b circuit. Voltage vectors $e$ and $-Ke$ extend in opposite directions from the junction or reference point. Current vector $i_1$, which represents the current translated through the capacitive reactance $x_{32}$ due to the voltage $e$, leads the voltage $e$ by nearly 90°. Current vector $i_3$, which represents the current carried by resistor 47 due to the net potential from the potential sources $-Ke$ and from the grid voltage $e_g$, leads the voltage $-Ke$ by less than 90° as illustrated. Current $i_2$, which is the vector sum of currents $i_1$ and $i_3$, as previously mentioned, leads the voltage $e_g$ by 90°, since reactive impedance $x_{30}$ is entirely capacitative. Voltage vector $e_g$ is the resulting alternating potential developed by the phase-shifting network for application to the control electrode of tube 21, and will presently be demonstrated to be of a phase to provide a space current $i_p$ which is in phase-quadrature relationship to the potential $e$.

It may be demonstrated mathematically that the space current $i_p$ of a triode, when operating under class A conditions, may be expressed by the formula $$i_p = \frac{e}{R_p} + ge_g \quad (5)$$

wherein the term $g$ represents the mutual conductance of the triode and the other terms are as indicated above with reference to Fig. 2a. This expression is also believed to be substantially correct for class C operation. The foregoing expression may be rewritten $$i_p = \frac{e + \mu e_g}{R_p} \quad (6)$$

wherein the term $\mu$ is the amplification factor of the tube. Accordingly, the internal potential drop in the anode-cathode circuit of the triode may be expressed $$i_p R_p = e + \mu e_g \quad (7)$$

Referring again to Fig. 3 of the drawings, it will be seen that the internal potential drop $i_p R_p$ comprises the vector sum of the voltage vectors $e$ and $\mu e_g$ as expressed in Equation 7 above, which may be adjusted by proper selection of the circuit components comprising the condensers 30 and 32 and the resistor 47 to be in phase quadrature with the voltage $e$, thus producing a space current $i_p$, which is also in phase quadrature with the voltage $e$, the latter representing the potential across the resonant circuit of the oscillator 20 of Figs. 1 and 2b. Condenser 30 is adjusted so that the desirable phase-quadrature relation is obtained at the range of the selected frequency range.

Thus any undesirable real component of space current, which would normally be present in a triode reactance-tube arrangement due to the anode control-electrode capacitance of the tube, is compensated for in the triode arrangement of the instant invention by the described phase-shifting network which utilizes the anode control-electrode capacitance of the tube 21. It will also be observed in the vector diagram of Fig. 3, that the resultant alternating potential $e_g$, which is effective to provide at the output electrodes of the triode 21 of Figs. 1 and 2a, a substantially purely reactive current, differs from or leads the phase of the first alternating potential $e$ by slightly more than 90°. Consequently this resultant alternating potential which is applied to the input electrodes of the triode 21 is effective to supply a real component of space current which is equal and opposite to that of the real component which would be translated by the anode-cathode circuit of the tube at the same bias but without the influence of the particular alternating potential applied to the input electrodes by the phase-shifting network. Also, this resultant alternating potential $e_g$ has a phase displacement with respect to the space current vector $i_p$ which is much less than 45°. As a result of the last-mentioned phase relation, the resultant input voltage is effective to produce a reactive space current having a magnitude which is greater than that which would be developed if a greater angular phase displacement existed. Consequently, an extremely sensitive reactance control arrangement results since the application of a relatively small unidirectional biasing potential from a unit such as the frequency detector 15 of Fig. 1, produces a material change in the magnitude of the reactive space current developed by the triode 21, particularly when the triode 21 is of the high mutual-conductance type. In fact, an arrangement in accordance with the instant invention designed to operate in the region of 20 megacycles has proved to be at least 4 times as sensitive as pentode reactance-tube arrangements.

In addition to being non-frequency selective over the selected range of frequencies, a phase-shifting network in accordance with the instant invention may readily be adjusted by means of the condenser 30 to provide the proper compensation necessary to develop a purely reactive space current. While it is possible to adjust other elements of the phase-shifting network to effect the desired compensation, adjustment of a component such as the condenser 30 in the control-electrode cathode circuit of the tube 21 has proved to be most expedient. Once proper adjustment is made for one operating condition to procure the desired phase angle between the voltage $e$ of the resonant circuit 33, 34 and the input potential $e_g$ of the triode 21, the adjustment is also satisfactory for different values of unidirectional biasing potentials which may be applied to the input circuit of triode 21 from the frequency detector 15 to alter the anode-cathode resistance of tube 21 and, hence, the magnitude of the reactive current developed thereby. Variations in the unidirectional potential applied to the control electrode 22 of the triode 21 are not effective to alter the potential across the resonant circuit 33, 34 and, hence, do not produce changes in the amplitude of the oscillations or undesired frequency changes.

While applicant does not intend to limit the invention to any specific circuit constants, the following circuit constants are given as illustrative of one embodiment of the invention constructed in accordance with the arrangement of Fig. 1.

Tubes 21 and 35—type 14W7 (connected as a triode, with screen and suppressor electrodes connected to the anode).
Condenser 30 (adjustable portion thereof)— 1.5 to 7 micromicrofarads.
Input capacitance of tube 21—6.5 micromicrofarads.
Condenser 32—4.5 micromicrofarads.
Resistor 47—270 ohms.
K (approximate value)—0.1.
Operating frequency—20 megacycles.

Fig. 4 is a circuit diagram representing a modified form of an oscillator control unit which is essentially similar to the control unit 19 of Fig. 1, corresponding elements being designated by the same reference characters primed. In the Fig. 4 arrangement, the control tube comprises a pentode 60 including a screen electrode 61 which is connected to a source +B through a resistor 62 and to ground through a bypass condenser 63. The suppressor electrode 64 is directly connected to the grounded cathode 23'. Because of the positive potential on the screen electrode 61 and the shielding action afforded by the suppressor electrode 64, the capacitance between the anode 24' and the control electrode 22' of pentode 60 is extremely small. It is therefore necessary to augment this anode control-electrode capacitance with a condenser 32' which has a capacitance of the same order of magnitude as that of the triode 21 in the Fig. 1 embodiment. Condenser 32' is preferably of the variable type in order to permit adjustment of the sensitivity of control unit 19' and also the magnitude of the voltage which is applied by the phase-shifting network including the condenser 32' to the input circuit of the pentode 60 so to develop a pure reactive current between the anode and cathode electrodes thereof. Condenser 30' need not be adjustable as in the Fig. 1 arrangement and may comprise, in whole or in part, the input capacitance of the pentode 60.

The operation is otherwise essentially similar to that of the Fig. 1 arrangement and will not be repeated. The voltage applied to the input circuit of the tube 60 is exactly in phase quadrature with that appearing between the output terminals thereof. Since reactance tube 60 is a pentode, the expression for the space current does not contain the term $$\frac{e}{R_p}$$

as in Equation 5. Increasing the capacitance of condenser 32' is effective to increase the sensitivity of the Fig. 4 arrangement. The limit of this sensitivity is reached when the load presented by the phase-shifting network to the resonant circuit is excessive. Since the Fig. 3 arrangement may be adjusted to derive a substantially pure reactive current from the resonant circuit, the sensitivity is greater than that of the usual pentode-type control arrangement. Likewise, the arrangement represented in Fig. 3 is sensitive over a wider range of frequencies than is a conventional pentode reactance-control unit.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An arrangement for simulating, over a selected range of frequencies, a controllable substantially pure reactive impedance comprising: an electron tube having control electrode and cathode input electrodes and having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and between said anode and said control electrode so that said reactive impedances have values varying in the same sense with frequency, said network including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature relation to said first alternating potential over said selected range of frequencies.

2. An arrangement for simulating, over a selected range of frequencies, a controllable substantially pure reactive impedance comprising: an electron tube effectively of the triode type having control electrode and cathode input electrodes and having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and the anode-control-electrode capacitance of said tube so that said reactive impedances have values varying in the same sense with frequency, said network including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature relation to said first alternating potential over said selected range of frequencies.

3. An arrangement for simulating over a selected range of frequencies, a controllable substantially pure reactive impedance comprising: an electron tube having control electrode and cathode input electrodes and having anode and cathode output electrodes between which said controllable reactive impedance is developed; means for applying to said output electrodes a first high-frequency alternating potential having a frequency within said range; and a phase-shifting network having a phase-shifting resistive impedance coupled to said control electrode and having phase-shifting reactive impedances comprised only by capacitance between said input electrodes and between said anode and said control electrode so that said reactive impedances have values varying in the same sense with frequency, said impedances being coupled to form a Y-connected phase-shifting network with said control electrode at the junction of said network, said network including means for applying through said resistive impedance to said junction of said reactive impedances a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature relation to said first alternating potential over said selected range of frequencies.

4. An arrangement for simulating, over a selected range of frequencies, a controllable substantially pure reactive impedance comprising: an electron tube of the high mutual conductance type having control electrode and cathode input electrodes and having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and between said anode and said control electrode so that said reactive impedances have values varying in the same sense with frequency, said network including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature relation to said first alternating potential over said selected range of frequencies.

5. An arrangement for simulating, over a selected range of frequencies, a controllable substantially pure reactive impedance comprising: an electron tube having control electrode and cathode input electrodes and having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and between said anode and said control electrode so that said reactive impedances have values varying in the same sense with frequency, said network including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential having a phase differing from the phase of said first alternating potential by more than 90 degrees to cause said tube to provide at said output electrodes a space current which is substantially in phase-quadrature relation to said first alternating potential over said selected range of frequencies.

6. An arrangement for simulating, over a selected range of frequencies, a controllable substantially pure reactive impedance comprising: an electron tube having control electrode and cathode input electrodes and having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and between said anode and said control electrode so that said reactive impedances have values varying in the same sense with frequency, said network including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature leading relation to said first alternating potential over said selected range of frequencies, thereby to provide a substantially pure inductive reactance across said output electrodes.

7. An arrangement for simulating, over a selected range of frequencies, a controllable substantially pure reactive impedance comprising: an electron tube effectively of the triode type having control electrode and cathode input electrodes and having anode and cathode output electrodes between which said controllable reactive impedance is developed; means for applying to said output electrodes a first high-frequency alternating potential having a frequency within said range; an electron tube effectively of thetriode type having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and the anode-control-electrode capacitance of said tube so that said reactive impedances have values varying in the same sense with frequency, said network including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature relation to said first alternating potential over said selected range of frequencies, said resultant alternating potential having a phase displacement with respect to said space current which is less than 45 degrees.

8. An arrangement for simulating, over a selected range of frequencies, a controllable substantially pure reactive impedance comprising: an electron tube effectively of the triode type having control electrode and cathode input electrodes and having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and the anode-control-electrode capacitance of said tube so that said network has a substantially nonfrequency-selective response characteristic over said range of frequencies, said network including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature relation to said first alternating potential over said selected range of frequencies.

9. An arrangement for simulating, over a selected range of frequencies, a controllable substantially pure reactive impedance comprising: an electron tube having control electrode and cathode input electrodes and having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and between said anode and said control electrode so that said reactive impedances have values varying in the same sense with frequency, said network including a condenser coupled in shunt relation with said input electrodes to supplement the input interelectrode capacitance and including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature relation to said first alternating potential over said selected range of frequencies.

10. An arrangement for simulating, over a selected range of frequencies, a controllable usbstantially pure reactive impedance comprising: an electron tube having control electrode and cathode input electrodes and having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and between said anode and said control electrode so that said reactive impedances have values varying in the same sense with frequency, said network including an adjustable condenser in shunt relation with said input electrodes for supplementing and for adjusting the magnitude of said capacitance between said input electrodes and including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature relation to said first alternating potential over said selected range of frequencies.

11. An arrangement for simulating, over a selected range of frequencies, a controllable substantially pure reactive impedance comprising: an electron tube of the pentode type having control electrode and cathode input electrodes and having anode and cathode output electrodes between which said controllable reactive impedance is developed; means for applying to said output electrodes a first high-frequency alternating potential having a frequency within said range; and a phase-shifting network having at least one phase-shifting resistive impedance and having phase-shifting reactive impedances comprised only by capacitance between said input electrodes and between said anode and said control electrode so that said reactive impedances have values varying in the same sense with frequency, said network including a condenser in shunt relation with said anode and said control electrode for augmenting the anode-control-electrode interelectrode capacitance and including means for applying through said resistive impedance to the junction of said reactive impedances at said control electrode a second high-frequency alternating potential having the same frequency but opposite polarity to that of said first alternating potential, the values of said impedances being so selected that said network is responsive to said first and to said second alternating potentials to apply to said input electrodes a resultant alternating potential of a phase to cause said tube to provide at said output electrodes a space current which is substantially in phase-quadrature relation to said first alternating potential over said selected range of frequencies.

LESLIE F. CURTIS.

REFERENCES CITED

The following references are of record in the file of this patent:

UNITED STATES PATENTS

| Number | Name | Date |
|---|---|---|
| 2,240,428 | Travis | Apr. 29, 1941 |
| 2,283,523 | White | May 19, 1942 |
| 2,398,793 | Magnuski | Apr. 23, 1946 |

Certificate of Correction

Patent No. 2,457,034. December 21, 1948.

LESLIE F. CURTIS

It is hereby certified that errors appear in the printed specification of the above numbered patent requiring correction as follows:

Column 2, line 42, for the words "to controllable" read *a controllable*; column 8, line 8, for "resulting" read *resultant*; column 13, line 40, claim 7, beginning with "an electron tube" strike out all to and including the words and semi-colon "said range;" in line 45; column 14, line 65, claim 10, for the syllable and hyphen "usb-" read *sub-*; and that the said Letters Patent should be read with these corrections therein that the same may conform to the record of the case in the Patent Office.

Signed and sealed this 21st day of June, A. D. 1949.

[SEAL]

THOMAS F. MURPHY,
*Assistant Commissioner of Patents.*